United States Patent [19]

Kammeraad

[11] Patent Number: 4,573,340
[45] Date of Patent: Mar. 4, 1986

[54] VALVE GUIDE LINER BROACHING TOOL

[75] Inventor: James A. Kammeraad, Holland, Mich.

[73] Assignee: K-Line Industries, Inc., Holland, Mich.

[21] Appl. No.: 470,614

[22] Filed: Feb. 28, 1983

[51] Int. Cl.[4] ............................................. B21J 13/02
[52] U.S. Cl. .......................................... 72/479; 72/370
[58] Field of Search .................... 72/479, 370; 29/450, 29/451, 453, 242; 279/1 Q, 102, 103; 173/128

[56] References Cited

U.S. PATENT DOCUMENTS

| | | | |
|---|---|---|---|
| 1,318,489 | 10/1919 | Donaldson | 407/13 |
| 2,285,956 | 6/1942 | Weber | 279/102 |
| 3,470,729 | 10/1969 | Andrs et al. | 72/479 |
| 4,404,874 | 9/1983 | Lieser | 279/102 |
| 4,405,020 | 9/1983 | Rassieur | 173/29 |

FOREIGN PATENT DOCUMENTS

| | | | |
|---|---|---|---|
| 521538 | 3/1931 | Fed. Rep. of Germany | 72/370 |
| 1493946 | 11/1977 | United Kingdom . | |
| 2072554 | 10/1981 | United Kingdom | 29/157.3 |
| 776803 | 11/1980 | U.S.S.R. | 407/13 |

*Primary Examiner*—Lowell A. Larson
*Assistant Examiner*—Jorji M. Griffin
*Attorney, Agent, or Firm*—Price, Heneveld, Huizenga & Cooper

[57] ABSTRACT

A broach specifically adapted for use in the final sizing of valve guides having a pilot, broaching surface and shank fabricated from a single piece of tool stock. The radius of the broaching surface, measured along a line perpendicular to both the longitudinal axis of the broach and a tangent to the broaching surface, is between 0.375 and 1.0 inches.

11 Claims, 4 Drawing Figures

VALVE GUIDE LINER BROACHING TOOL

BACKGROUND OF THE INVENTION

This invention relates to a simple, economical method of sizing the inside diameters of tubular valve guide inserts after the inserts are forced into the reamed valve guides.

The method of inserting phosphor bronze valve guide liners of one type to which the present invention relates is described in U.S. Pat. Nos. 3,828,415 and 3,828,756. The specifications and drawings of these patents are specifically incorporated herein by reference. Basically, the worn-out valve guides are rebuilt by reaming them so as to enlarge the diameters thereof. A tubular, longitudinal insert is forced into each of the reamed valve guides to provide a new surface for the valve stem. The inserts have a stepped longitudinal slit extending the length thereof. This slit closes as the insert is forced into and radially compressed by the reamed guide. The inserts, when in working position, have an outer diameter slightly greater than or equal to the inner diameter of the reamed guide and are retained in position by the radial compression of the guide. The inserts are also utilized in the manufacture of original equipment.

In typical internal combustion engine building or rebuilding operations, the insides of such tubular metal inserts, after insertion are finally sized with a reamer to insure concentricity and the desired clearance between the inner diameter of the inserts and the valve stems which will reciprocate therein. This is a labor-intensive process requiring specially fluted, heat treated and ground reaming tools. It removes, moreover, the interior surface layer of the liner which, when the same is the product of a rolling operation as set forth in the aforementioned patents, is substantially harder and thus capable of longer wear than the adjacent liner metal.

Instead of using the rolled liners which are the subject of the aforementioned patents, machined cylindrical bronze inserts, knurled or otherwise, may be utilized. A third alternative is to merely knurl the interior of the worn cast iron guide to displace metal inwardly. It remains generally necessary, in either of these cases, to finally size the guide inner diameter with a reamer or like cutting tool. The final sizing process does nothing to burnish or harden the working surface of the guide. In the case of the knurled guide, it actually removes additional metal, further weakening the working area of the guide and wasting metal which could otherwise be usable in a subsequent rebuilding operation.

It has been proposed previously to substitute a broaching process for the reaming process to finally size the guides. The proposed tool consisted of a spherical broaching element on the end of a short rod. The sphere diameter corresponded to the desired diameter of the valve guide insert. At the other end of the rod was a female joint for receiving the male joint of a driver rod roughly the same diameter. In operation, the male-female joint frequently fractured when subjected to the hammering, particularly air hammering, required to drive the broaching ball element through the valve guide. Furthermore, many of the spherical elements were found to scrive or score the insides of the tubular valve guide rendering them either unfit for use or of marginal fitness for use.

SUMMARY OF THE INVENTION

It is an object of this invention to provide a simple method of sizing the inside diameters of valve guides, especially guides having inserted therein liners or inserts made of bronze, phosphor, silicone, aluminized or plain, but also cast iron guides. It is another object of this invention to reduce the capital cost of equipment required to build or rebuild valve guides. It is an object of this invention in the case of a knurled guide, be it bronze or iron, to provide a final sizing tool which removes no metal, leaving a stronger guide as well as one which may be adapted for a subsequent rebuilding operation. Finally, it is yet another object of this invention to provide a sturdy valve broaching tool which can withstand air hammering and eliminate scriving of the valve guide.

The broaching tool of the present invention comprises a shank for forcing the tool through the valve guide, a pilot for guiding the tool through the guide and a broaching surface between and integral with the shank and pilot with a working diameter about the same as the desired inside diameter of the guide. The broaching surface has a radius from about $\frac{3}{8}$-inch to about one inch, the radius being measured along a first line which is perpendicular to and intersects with the longitudinal axis of the tool and which forms a right angle and intersects with a second line tangent to the broaching surface. This broaching tool is specially adapted for broaching rolled or machined bronze valve guide inserts but can also be utilized with other metals such as cast iron as hereinafter set forth.

DESCRIPTION OF THE PREFERRED EMBODIMENTS

Figure 1:
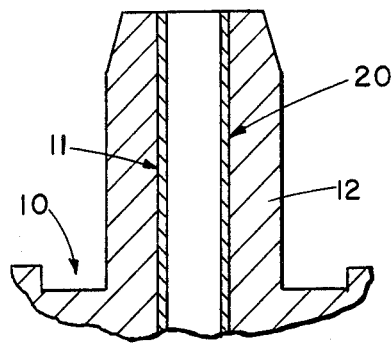
FIG. 1 is a partial side elevation in section of a typical valve guide bronze tubular insert shown in position in a cylinder head.

Referring now to the drawings, and to FIG. 1 in particular, an overhead valve engine head 10 has machined therein a valve guide 11 with an exposed shoulder portion indicated generally by the reference numeral 12. Valve guide 11 having been worn through use is reamed and valve guide insert 20 is installed therein. FIG. 1, alternatively, may represent a new engine, the valve guides of which have purposely been bored oversize to receive the inserts as original equipment. Such inserts, of course, come in a variety of sizes depending upon the valve stem diameters specified by the engine manufacturers. A more complete discussion of this process can be found in U.S. Pat. No. 3,828,415.

Figure 2:
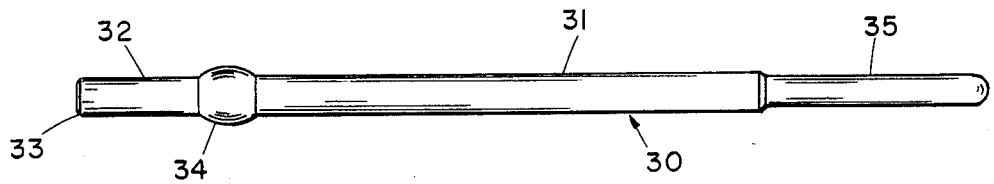
FIG. 2 is a side elevation of the broaching tool of the present invention which is symmetrical about its longitudinal axis.

Referring now to FIG. 2, there is shown a preferred embodiment of the broaching tool of the present invention. The broaching tool 30 consists of shank 31, broaching surface element 34 and pilot 32. Tool 30 is fabricated by conventional techniques from a single piece of high-speed steel as hereinafter more specifically identified. Both shank 31 and pilot 32 have circular cross sections of roughly the same diameters and share a common longitudinal axis. The diameters of these sections are somewhat smaller than the working diameter D of the tool. A differential of 0.02 inches has been found satisfactory.

Figure 3:
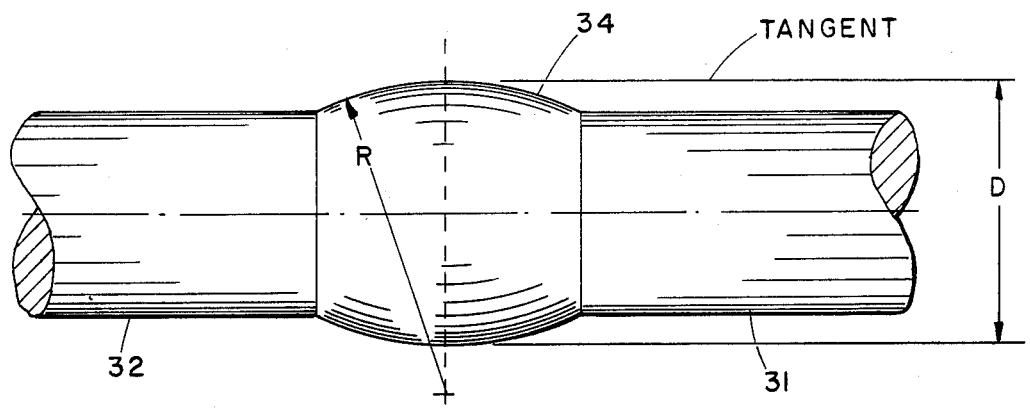
FIG. 3 is an expanded side elevation of the broaching surface element of the broaching tool of the present invention.

Referring now to FIG. 3, the working diameter D (as contrasted with the radius R which will be discussed below) is roughly the size of the desired inside diameter of valve guide insert 20. It has been found, however, that a broach of the present invention will not produce an inside diameter in a phosphor bronze insert, machined or rolled, the same as working diameter D. It has more particularly been found that as the metal of the valve guide insert is packed by the broaching surface element being forced through valve guide insert 20 in valve guide 11 and compacting the bronze of insert 20 against the valve guide 11 of cylinder head 10, the inside diameter of valve guide insert 20 will shrink behind broaching surface element 34 as broaching surface element 34 passes through insert 20. The more metal that is tried to be packed, the more the inner diameter of the insert will shrink behind the broach.

It has been observed with respect to the rolled liners, for example, that an 11/32-inch insert or liner, after installation, will have an inside diameter of approximately 0.341 inches (11/32-inch equals 0.3438 inches). To expand this inner diameter to approximately 0.3435 inches, a broach having a working diameter D of 0.3445 inches should be utilized. It is preferred, in order to accommodate fluctuations in valve stem diameters, that five "11/32" broaching tools be provided the installer having working diameters D of 0.341, 0.342, 0.3435, 0.3445 and 0.3455 inches.

As seen in FIG. 3, broaching surface 34 is nonspherical but arcuate in longitudinal cross section as determined by radius R. The radius R as shown in FIG. 3 is important to the successful use of broaching tool 30. Radius R is measured along a first line which intersects and is perpendicular to the longitudinal axis of the tool, and which forms a right angle and intersects a second line tangent to broaching surface 34. Broaching surface 34 should have a radius measured as shown in FIG. 3 ranging from approximately ⅜-inch to approximately one inch regardless of the dimension of working diameter D. Radius R is greater than one-half of working diameter D, giving broaching surface 34 its nonspherical shape. In the illustrated embodiment, radius R is greater than the whole working diameter D. Preferably, radius R should be approximately 0.5 inches for broaching a rolled phosphor bronze valve guide insert 20.

It has been found that if the radius is too small, there is a scriving effect—a shaving of the inside surfaces of insert 20—as the broaching tool 20 is hammered through the valve guide insert. Scriving roughens the surface of the inside of the insert, making the insert a poor friction surface for a valve stem. Scriving was an important limitation in the prior art spherical broaching element discussed previously.

Pilot 32, typically about one inch in length, provides initial guidance of the broaching tool through tubular insert 20 insuring coaxial positioning of the tool with respect to the insert through which it is to be driven. Bevel 33 is provided to prevent scoring of the inside surfaces of insert 20 by pilot 32. Broaching tool 30 can be made from high-speed steel, especially M-2 high-speed steel or equivalents thereof.

Figure 4:
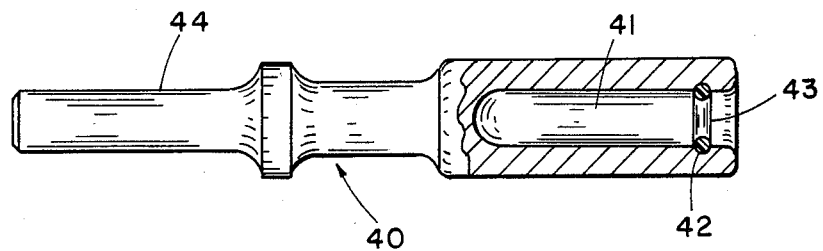
FIG. 4 is a side elevation, in partial cross section, of an air hammer driver socket adapted to receive the broaching tool of FIG. 2.

The broaching tool 30 of FIG. 2 can be used with an air hammer. As shown in FIG. 4, an air hammer driver socket 40 must be used in conjunction with an air hammer to use broaching tool 30 in this manner. Driver socket 40 consists of bore 41 which receives the end of shank 31 distal from broaching surface element 34. Annular groove 42 is provided to receive O-ring 43 made from a resilient material which frictionally engages shank 31 such that shank 31 can be suspended in bore 41 without falling therefrom. The socket is purposely oversized with respect to shank 31. This oversizing compensates for minor misalignment when the tool is in use. The longitudinal axis of shank 31, more particularly, can misalign with that of bore 41 should the installer not have the air hammer longitudinal axis consistent with that of the valve guide, preventing scriving and/or tool breakage.

The remaining portions of driver socket 40 indicated at 44 are configured so as to accommodate a standard air hammer. This configuration is well known in the art. Driver socket 40 can be made from socket steel or equivalents thereof. So that a standardized air hammer driver socket 40 can be used, the diameter of impact rod 31 can be constricted as indicated at 35 if the impact rod 31 diameter is greater than the diameter of bore 41 in driver socket 40.

The length of the portion of shank 31 with the constricted diameter as indicated at 35 should be approximately equal to the depth of bore 41 in driver socket 40. The length of shank 31 between the area of constricted diameter 35 and broaching surface 34 should be at least as long as the valve guide insert so that the broaching surface can be forced completely through the valve guide.

The operation of the broaching tool above will now be described. After a valve guide insert 20 is positioned in valve guide 11 by procedures well known in the art and knurled if desirable, a broaching tool with an appropriate working diameter D is selected. Air hammer driver socket 40 is attached to the end of shank 31 distal from broaching surface 34. Pilot 32 is then inserted in valve guide insert 20. An air hammer is connected to driver socket 40 and is activated, forcing broaching surface 34 completely through valve guide insert 20. At this point, the air hammer is deactivated. The broaching tool will remain in the valve guide insert without falling therethrough because of the frictional engagement of shank 31 in O-ring 43. When the installer's hands are free, he can pull broaching tool 30 out of the other end of valve guide insert 20 from which the tool was inserted. The steps above can be repeated for the other valve guide inserts 20 in cylinder head 10. It should be apparent that broaching tool 30 can also be forced through a valve guide insert with a standard workshop hammer as well.

The usem of broaching tool 30, therefore, facilitates the rapid final sizing of the inside diameters of bronze tubular valve guide inserts. Since no reaming equipment is required, the capital costs associated with engine rebuilding operations can be reduced. Furthermore, the broaching tool 30 is simple to use and is reliable. Most importantly, broaching tool 30 eliminates scriving and produces an excellent surface on the inside of valve guide inserts without removal of additional metal. The original hardened surface, the product of the rolling operation, is retained providing for a long-wearing valve guide.

While the preceding disclosure relates primarily to use of the tool which is the subject of this invention on rolled inserts, the tool, as noted, can also be utilized with machined bronze inserts, knurled or not, and knurled cast iron guides. Again, no additional metal is removed, leaving the guide of optimum strength and, in many cases, suitable for subsequent rebuilding. No significant shrinkage will be experienced when the tool is utilized with a knurled cast iron guide. Only a very minor amount of shrinkage is anticipated when it is utilized with a knurled bronze guide.

The tool which is the subject of this invention is not intended, as will be readily appreciated by those skilled in the art, to displace large amounts of valve guide material. It will move bronze up to about five to ten thousandths of an inch. It will move knurled cast iron a somewhat lesser distance.

Reasonable variations and modifications are possible within the scope of the foregoing disclosure, the drawings and appended claims without departing from the spirit of this invention.

The embodiments of the invention in which an exclusive property or privilege is claimed are defined as follows:

1. A broaching tool for sizing the inside diameter of a valve guide insert for an internal combustion engine cylinder head valve guide comprising:
   (a) a shank for forcing the tool through said valve guide insert;
   (b) a pilot having the same longitudinal axis as said shank; and
   (c) a nonspherical broaching surface between and integral with said pilot and shank having a working diameter greater than the diameter of said shank and pilot and approximately the same as the desired inside diameter of said valve guide insert, said surface being arcuate in longitudinal cross section having a radius greater than one-half of said working diameter, said radius intersecting the longitudinal axis of said tool, said radius being measured along a first line which is perpendicular to and intersects with the longitudinal axis of said tool and which forms a right angle to and intersects with a second line tangent to said broaching surface.

2. The broaching tool as set forth in claim 1 wherein the length of said shank exceeds the length of said insert.

3. The broaching tool as set forth in claim 1 wherein said radius is about 0.375 inch to one inch.

4. The broaching tool as set forth in claim 3 wherein said broaching surface has a radius of about 0.5 inches.

5. The broaching tool as set forth in claim 1 wherein said radius is greater than the entire working diameter.

6. A broaching tool-driver socket combination for sizing the inside diameter of a valve guide insert for an internal combustion engine cylinder head valve guide,
   (a) a broaching tool comprising:
      (i) a shank for forcing the tool through said valve guide insert;
      (ii) a pilot having the same longitudinal axis as said shank; and
      (iii) a nonspherical broaching surface between and integral with said pilot and shank having a working diameter greater than the diameter of said shank and pilot and approximately the same as the desired inside diameter of said valve guide insert, said surface being arcuate in longitudinal cross section having a radius greater than one-half of said working diameter, said radius intersecting the longitudinal axis of said tool, said radius being measured along a first line which is perpendicular to and intersects with the longitudinal axis of said tool and which forms a right angle to and intersects with a second line tangent to said broaching surface;
   (b) a driver socket comprising:
      (i) a bore adapted to receive the free extremity of said shank; and
      (ii) means within said bore for retaining said shank therein.

7. The socket combination as set forth in claim 6 wherein said retaining means comprises an annular groove within said bore having an elastic O-ring positioned therein, the inner diameter of said O-ring being less than the diameter of said shank, the inner diameter of said bore being greater than the diameter of said free extremity to compensate for unintentional misalignment.

8. The socket combination as set forth in claim 7 which further comprises means for affixing the socket combination to an air hammer.

9. The socket combination as set forth in claim 6 wherein the length of said shank exceeds the length of said guide plus the length of said bore.

10. The socket combination as set forth in claim 6 wherein said radius is 0.375 inch to one inch.

11. The socket combination as set forth in claim 6 wherein said radius is greater than the entire working diameter.

* * * * *